US011992715B2

(12) United States Patent
Colling et al.

(10) Patent No.: US 11,992,715 B2
(45) Date of Patent: May 28, 2024

(54) MODULAR FIRE EXTINGUISHING VEHICLE, AND A METHOD FOR OPERATING A MODULAR FIRE EXTINGUISHING VEHICLE

(71) Applicant: Scania CV AB, Södertälje (SE)

(72) Inventors: Morgan Colling, Hölö (SE); Mikko Kallio, Hölö (SE); Sami Teppola, Nykvarn (SE); Tomas Skeppström, Södertälje (SE); André Claesson, Tullinge (SE); Robert Sjödin, Nyköping (SE); Linus Åhrlig, Västerhaninge (SE)

(73) Assignee: Scania CV AB, Södertälje (SE)

( * ) Notice: Subject to any disclaimer, the term of this patent is extended or adjusted under 35 U.S.C. 154(b) by 415 days.

(21) Appl. No.: 17/297,584

(22) PCT Filed: Nov. 25, 2019

(86) PCT No.: PCT/SE2019/051190

§ 371 (c)(1),
(2) Date: May 27, 2021

(87) PCT Pub. No.: WO2020/130905

PCT Pub. Date: Jun. 25, 2020

(65) Prior Publication Data

US 2022/0023690 A1 Jan. 27, 2022

(30) Foreign Application Priority Data

Dec. 20, 2018 (SE) .................................... 1851625-2

(51) Int. Cl.

*A62C 27/00* (2006.01)
*A62C 3/07* (2006.01)
*A62C 35/68* (2006.01)

(52) U.S. Cl.

CPC ................ *A62C 27/00* (2013.01); *A62C 3/07* (2013.01); *A62C 35/68* (2013.01)

(58) Field of Classification Search

CPC ............ A62C 27/00; A62C 3/07; A62C 35/68
(Continued)

(56) References Cited

U.S. PATENT DOCUMENTS

| | | | |
|---|---|---|---|
| 10,380,711 B2 | 8/2019 | Stefan et al. |
| 2009/0260836 A1 | 10/2009 | Laskaris et al. |
| 2019/0294165 A1 | 9/2019 | Hofmann et al. |

FOREIGN PATENT DOCUMENTS

| | | |
|---|---|---|
| CN | 105561505 A | 5/2016 |
| CN | 106943692 A | 7/2017 |

(Continued)

OTHER PUBLICATIONS

Scania CV AB, International Patent Application No. PCT/SE2019/051190, International Preliminary Report on Patentability, dated Jun. 16, 2021.

(Continued)

*Primary Examiner* — Christopher S Kim
(74) *Attorney, Agent, or Firm* — Moore and Van Allen PLLC; W. Kevin Ransom

(57) ABSTRACT

A modular fire extinguishing vehicle comprising a drive module and a releasable connected fire extinguishing module and comprising a plurality of containers comprising different types of fire distinguishing agents and a fluid line connected thereto. The fluid line comprises a connecting interface for connection to a port of another vehicle. The vehicle also comprises a control device configured to obtain information about an ongoing or imminent fire in another vehicle and a position of the other vehicle and to autonomously or remotely operate the modular fire extinguishing vehicle to drive to a position of the other vehicle based on (Continued)

the position information, to connect the fluid line to a port of the other vehicle; and control transfer of a selected one of the different types of fire extinguishing agents into the fluid line, wherein the selected type of fire extinguishing agent is based on the information about the ongoing or imminent fire.

17 Claims, 4 Drawing Sheets

(58) Field of Classification Search
USPC .......................... 169/53, 62, 43, 46; 239/172
See application file for complete search history.

(56) References Cited

FOREIGN PATENT DOCUMENTS

| | | | |
|---|---|---|---|
| CN | 108014437 | A | 5/2018 |
| CN | 108989379 | A | 12/2018 |
| EP | 1563873 | A2 | 8/2005 |
| EP | 1726334 | A1 | 11/2006 |
| WO | 9939773 | A1 | 8/1999 |
| WO | 2018011066 | A1 | 1/2018 |
| WO | 2018222375 | A1 | 12/2018 |

OTHER PUBLICATIONS

Scania CV AB, European Patent Application No. 19899464.2, Extended European Search Report, dated Aug. 19, 2022.
Scania CV AB, International Patent Application No. PCT/SE2019/051190, International Search Report, dated Dec. 18, 2019.
Scania CV AB, International Patent Application No. PCT/SE2019/051190, Written Opinion, dated Dec. 18, 2019.
Scania CV AB, Chinese Patent Application No. 201980075674.9, First Office Action, dated Nov. 8, 2021.
Scania CV AB, Brazilian Patent Application No. BR112021008962-4, Preliminary Office Action, dated Aug. 15, 2023.

MODULAR FIRE EXTINGUISHING VEHICLE, AND A METHOD FOR OPERATING A MODULAR FIRE EXTINGUISHING VEHICLE

CROSS-REFERENCE TO RELATED APPLICATIONS

This application is a National Stage Patent Application (filed under 35 § U.S.C. 371) of PCT/SE2019/051190, filed Nov. 25, 2019 of the same title, which, in turn claims priority to Swedish Patent Application No. 1851625-2 filed Dec. 20, 2018 of the same title; the contents of each of which are hereby incorporated by reference.

FIELD OF THE INVENTION

The present disclosure relates to techniques in the context of vehicles, and to a modular fire extinguishing vehicle and a method for operating a modular fire extinguishing vehicle. The disclosure also relates to a computer program for performing the proposed method, and a computer program product comprising the computer program.

BACKGROUND

Most buildings comprise an automatic fire detection system that automatically detects effects of fire. The system may for example comprise fire sprinklers that discharge water when a fire is detected. The system also reports the detected fire to a fire station, whereupon a manned fire engine will drive to the location of the fire and try to extinguish it. However, in remote places, it may take time before the fire brigade arrives. It might also not be easy to understand what has caught fire in the building, and how to extinguish it efficiently. Also, it may be dangerous for the fire fighter to be present close to the fire, which can make fire suppression difficult.

From WO2018/011066A1, an unmanned vehicle for initiating a fire extinguishing action is known. The unmanned vehicle verifies detected fires in e.g. hazardous buildings and/or areas and deletes the fire by means of an extinguishing system. Thereby fire fighters do not have to be present to extinguish the fire.

Vehicles of today may comprise various kinds of energy storages, such as gas and batteries. If a failure or accident occurs, the batteries may become overheated and catch fire. The fire often starts deep inside the vehicle and may therefore be difficult to access and extinguish. It is desired to suppress such fires rapidly before they spread.

SUMMARY OF THE INVENTION

It is an object of the disclosure to alleviate at least some of the drawbacks with the prior art. Thus, it is an object to provide an unmanned fire extinguishing vehicle that is arranged to efficiently and safely suppress fires in vehicles.

According to a first aspect, the disclosure relates to a modular fire extinguishing vehicle comprising at least one drive module and a fire extinguishing module releasably connected to the at least one drive module. The fire extinguishing module comprises a plurality of containers comprising different types of fire distinguishing agents and a fluid line connected to the plurality of containers. The fluid line comprises a connecting interface for connection to a port of another vehicle. The modular fire extinguishing vehicle comprises a control device configured to obtain information about an ongoing or imminent fire in another vehicle and information indicative of a position of the other vehicle. The control device is configured to autonomously operate the modular fire extinguishing vehicle to drive to a position in proximity to the other vehicle based on the position information of the other vehicle, to enable connection of the connecting interface of the fluid line to a port of the other vehicle. The control device is also configured to control transfer of a selected one of the different types of fire extinguishing agents from its corresponding container into the fluid line, wherein the selected type of fire extinguishing agent has been selected, based on the information about the ongoing or imminent fire in the other vehicle.

The modular fire extinguishing vehicle provides an efficient way of handling fires in vehicles. The modular fire extinguishing vehicle carries a plurality of different agents and can thus choose between them in order to efficiently suppress the fire or imminent fire.

According to some embodiments, the control device is configured to selectively control connection and disconnection of the connecting interface of the fluid line to a port of the other vehicle. Thus, the fluid line may be automatically connected to a port of the other vehicle, such that an agent can be passed within the other vehicle to the fire or imminent fire.

According to some embodiments, the control device is configured to control a fluid control arrangement to transfer of the selected type of fire extinguishing agents from its corresponding container in the fluid line, when the connecting interface is connected to the port. Thus, the agent may be automatically passed from the modular fire extinguishing vehicle to the other vehicle.

According to some embodiments, the information about an ongoing or imminent fire comprises information indicating the type of component being on fire or on imminent fire, and wherein the control device is configured to match the type of component with the different types of fire extinguishing agents, and to select a type of fire extinguishing agent to suppress the fire, based on the result of the matching. Thus, based on what is on fire, a matching agent is selected that is considered to most efficiently suppress the fire.

According to some embodiments, the control device is configured to obtain information about a selected port on the other vehicle that is selected for connecting the connecting interface of the fluid line to for suppressing the ongoing or imminent fire, and to autonomously or remotely operate the modular fire extinguishing vehicle to stop at a position, in which position the connecting interface of the fluid line is connectable to the selected port, based on the information about the selected port. Thus, the modular fire extinguishing vehicle is supported in finding a suitable port to pass agent into, such that the fire can be efficiently suppressed.

According to some embodiments, the fire extinguishing vehicle comprises a detector configured to detect an indication of a selected port on the other vehicle. The control device is configured to obtain the information of the detected indication of the selected port from the detector. Thus, the modular fire extinguishing vehicle may itself autonomously identify what port is suitable to pass agent into, such that the fire can be efficiently suppressed.

According to some embodiments, the control device is configured to receive information about the selected port from the other vehicle and/or from the off-board system. For example, the information is retrieved from the other vehicle directly, or the information is retrieved via the off-board system.

According to some embodiments, the fluid line comprises a fire hose configured to be extended from the modular fire extinguishing vehicle to the port of the other vehicle. The control device is configured to control extension of the fire hose to the port. Thus, the modular fire extinguishing vehicle may automatically extend the fire hose such that it can be connected to a port of the other vehicle.

According to a second aspect, the disclosure relates to a method for operating a modular fire extinguishing vehicle. The vehicle comprises at least one drive module, a fire extinguishing module releasably connected to the at least one drive module. The fire extinguishing module comprises a plurality of containers comprising different types of fire distinguishing agents and a fluid line connected to the plurality of containers. The fluid line comprises a connecting interface for connection to a port of another vehicle. The method comprises obtaining information about an ongoing or imminent fire in another vehicle and information indicative of a position of the other vehicle, and autonomously operating the modular fire extinguishing vehicle to drive to a position in proximity to the other vehicle based on the position information of the other vehicle, to enable connection of the connecting interface of the fluid line to a port of the other vehicle. The method further comprises controlling transfer of a selected one the different types of fire extinguishing agents from its corresponding container into the fluid line, wherein the selected type of fire extinguishing agent has been selected based on the information about the ongoing or imminent fire in the modular vehicle. The same positive effects as achieved by the first aspect, may be achieved by the method according to the second aspect.

According to a third aspect, the disclosure relates to a computer program comprising instructions which, when the program is executed by a control device, cause the control device to carry out the method according to the third aspect.

According to a fourth aspect, the disclosure relates to a computer-readable storage medium comprising instructions which, when executed by a control device, cause the control device to carry out the method according to the third aspect.

DETAILED DESCRIPTION

In the following disclosure, a modular fire extinguishing vehicle and a corresponding method for operating the modular fire extinguishing vehicle, are presented. A modular vehicle is herein defined to be a vehicle that comprises at least one drive module and a functional module that are releasably connected. The modular fire extinguishing vehicle is assembled from at least one drive module and a functional module being a fire extinguishing module. The fire extinguishing module is equipped with a plurality of different agents adapted to suppress fire in different components or parts of, for example, a vehicle. These different components may be a battery, an electrical motor, a transmission or vehicle brake etc. In response to received information about a fire or imminent fire in another vehicle, the modular fire extinguishing vehicle may autonomously drive to the other vehicle, connect to a port of the other vehicle and pass a selected agent into the port, in order to suppress or extinguish the fire or imminent fire in the other vehicle. Thereby, an efficient and safe fire extinguishing operation can be performed.

Before the modular fire extinguishing vehicle and adherent methods are further explained, an example of a modular vehicle, and assembling of such a vehicle, will be described.

Figure 1:
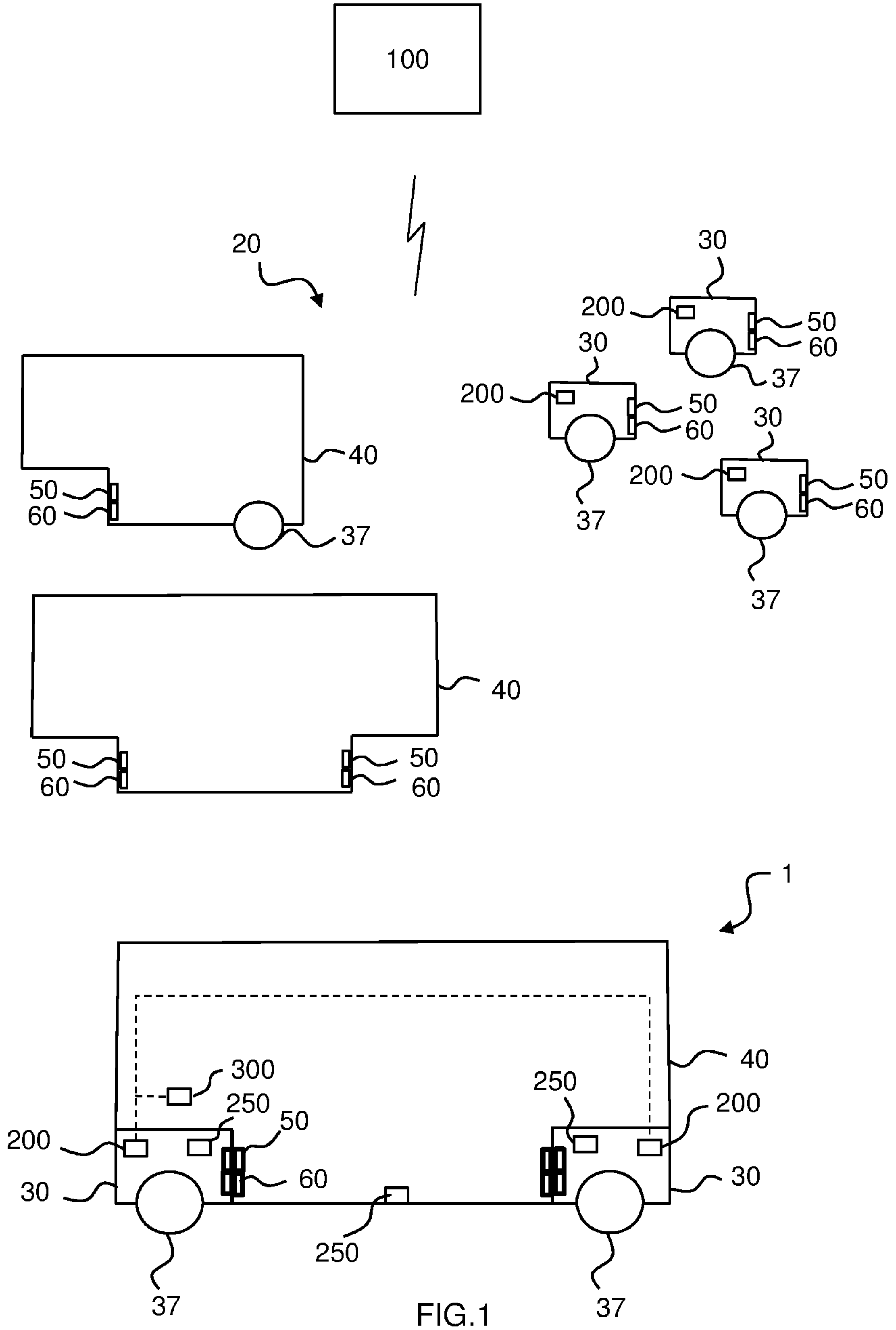
FIG. 1 illustrates a set of modules, a vehicle assembled from the set of modules, and an off-board system.

FIG. 1 illustrates an example set of modules 20 for assembling a vehicle 1. An off-board system with a control device 100 and an example of an assembled vehicle 1 is also illustrated. The set of modules 20 comprises a plurality of drive modules 30 and a plurality of functional modules 40. The drive modules' 30 main function is typically to drive (e.g. propel, steer and brake) a vehicle 1. The drive modules 30 comprises a pair of wheels 37 and are configured to be autonomously operated. The functional modules 40 are configured to perform a certain function such as to carry a load, e.g. goods or people.

Each module 30, 40 in the set of modules 20 comprises at least one interface 50 releasably connectable to a corresponding interface 50 on another module 30, 40. Since the drive module 30 may be configured to be operated as an independently driven unit by means of a control device 200, the drive module may 30 be connected with, or disconnected from, the functional module 40 without manual work.

An example of a sequence for assembly of a vehicle 1 will be described below. An operator may receive a mission from a client to transport goods from one location to another. The operator enters the information about the mission into the control device 100 of the off-board system via a user interface, such as a touch screen or similar. It is pointed out that this is merely an example, and the received mission may automatically be translated and/or inputted to the control device 100. The control device 100 then determines which function to be performed and thus which type of vehicle 1 is required to complete the mission. In this example, the required vehicle 1 may be a truck. The control device 100 selects which modules 30, 40 to use for the required truck. The type of vehicle 1 and the modules 30, 40 required to complete the mission may for example be selected based on information about the goods, the distance to travel and/or the geographical location. The control device 100 then suitably converts the mission into a command for one or two selected drive modules 30 to physically and electrically connect with the selected functional module 40. The control devices 200 of the drive modules 30 each receives the command and converts the command to control signals for the respective drive module 30. The drive modules 30 are thereby controlled to physically and electrically connect with the functional module 40. Controlling the drive module 30 to connect with a functional module 40 may comprise controlling the drive module 30 to identify the position of the selected functional module 40 and move to that position. The position of the selected functional module 40 may be determined based on information received in the command to connect the drive module 30 with the functional module 40. Alternatively, the command to connect the drive module 30 and the functional module 40 is transmitted to both the drive module 30 and the functional module 40, whereby the functional module 40 prepares for the connection and starts transmitting a signal. The drive module 30 may then determine the position of the functional module based on this transmitted signal. The drive modules 30 are thus autonomously operated to find the selected functional module 40 and connect with that functional module 40. At least one sensor device 60 arranged at the drive modules 30 and/or the functional module 40 may be configured to sense when the physical and/or electrical connection has been performed. The at least one sensor device 60 may send a signal to the control devices 200 indicating that the connection(s) have been performed. Based on the signal from the at least one sensor device 60, the control device 200 in a drive module 30 may send a verification signal to the control device 100 for verification of the connection(s). The control device 100 may then generate a unique vehicle identity for the assembled vehicle 1. A vehicle 1 is thus assembled and the vehicle 1 is ready to perform the mission. The modular vehicle can easily be assembled and re-assembled e.g. to perform a certain mission. The present disclosure is applicable on all sorts of road vehicles. However, the disclosure may relate to heavy vehicles, such as buses, trucks etc. Specifically, the present disclosure may relate to vehicles for use on public roads.

By combining drive modules 30 and functional modules 40, different types of vehicles 1 can be achieved. Some vehicles 1 require two drive modules 30 and some vehicles 1 only require one drive module 30, depending on the structural configuration of the functional module 40. Each drive module 30 comprises a control device 200 and is configured to communicate with a control device 100 in a control center or off-board system. Each functional module 40 may comprises a control device 300 and may thus also communicate with the control device 100 in a control center or off-board system. Considering an assembled vehicle 1 comprises two drive modules, the control device 100 in the off-board system may appoint one drive module to be master drive module and the other to be slave drive module.

In some embodiments, the control device 200 of the drive module 30 is configured to communicate with the control device 300 of a functional module 40, as illustrated by dashed lines in FIG. 1. The communication between the modules 30, 40 may be wireless or conductively or by wire. The wireless communication may be directly between the modules or via the off-board system (i.e. comprising a control device 100). The modules 30, 40 of an assembled vehicle may communicate with each other and/or with the control device in the off-board system via 4G, 5G, V2V (Vehicle to Vehicle), Wi-Fi or any other wireless communication means.

In FIG. 1 the drive modules 30 are illustrated with only one interface 50, on one side of the drive module 30. However, it is to be understood that each drive module 30 may comprise a plurality of interfaces 50 for releasable connection with other modules 40. The interface(s) 50 of the drive modules 30 may be arranged on different sides of the drive module 30 and thus enable connection with other modules 30, 40 on multiple sides of the drive module 30. The interfaces 50 on the drive modules 30 and the functional modules 40 respectively, are suitably arranged on corresponding positions to enable connection between the modules 30, 40.

A drive module 30 comprises a sensor system 250 including a variety of sensors for perceiving the environment, navigate autonomously and avoid obstacles. For example, a drive module 30 may comprise a navigation unit (not shown), comprising a positioning unit using the Global Positioning System (GPS), in order to navigate between different positions. A functional module 40 may also comprise a sensor system 250 for perceiving the environment.

Figure 2:
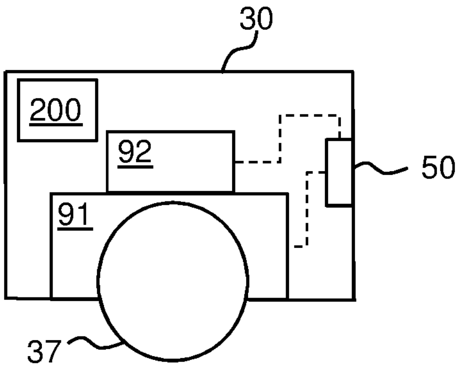
FIG. 2 schematically illustrates a drive module in further detail in a side view.

FIG. 2 schematically illustrates a drive module 30 in further detail in a side view. The drive module 30 comprises at least one (only one illustrated) propulsion system 91, an energy storage 92, an interface 50 and a control device 200. The energy storage 92 provides energy to the propulsion system 91. The propulsion system 91 comprises at least one electrical machine, thus an electrical motor. The propulsion system(s) 91 is/are arranged to propel the pair of wheels 37 of the drive module 30.

Figure 3:
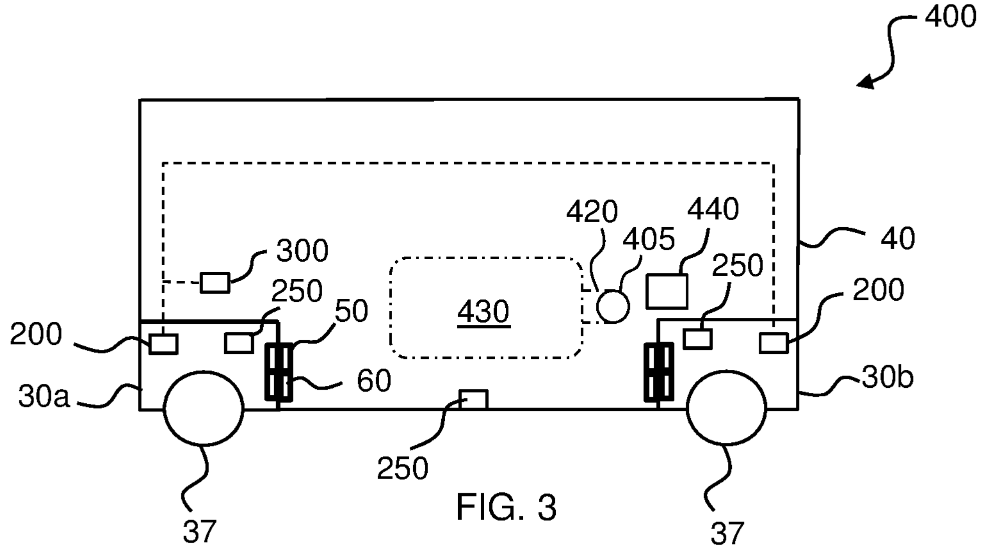
FIG. 3 illustrates a modular fire extinguishing vehicle according to the first aspect, according to some embodiments.

FIG. 3 illustrates a modular fire extinguishing vehicle 400 according to the first aspect, according to some embodiments. The modular fire extinguishing vehicle 400 is for example the same modular vehicle 1 as illustrated in FIG. 1, where the functional module 40 is a fire extinguishing module 40. Thus, the modular fire extinguishing vehicle 400 comprises two drive modules 20, and a fire extinguishing module 40 releasably connected to two drive modules 20. Alternatively, the modular fire extinguishing vehicle 400 comprises only one drive module 20, and a fire extinguishing module 40, where the fire extinguishing module 40 comprises integrated wheels 37. The modular fire extinguishing vehicle 400 may also comprise more than two drive modules, and more than one functional module, e.g. more than one fire extinguishing module 40. Thus, the modular fire extinguishing vehicle 400 comprises at least one drive module 20, and at least one fire extinguishing module 40 releasably connected to the at least one drive module 20.

The fire extinguishing module 40 comprises a plurality of containers 430, 431, 432 comprising different types of fire distinguishing agents. In FIG. 3 only one container 430 is visible, however, in the other view in FIG. 4 more containers 431, 432 are visible. An agent is for example water, foam, dry powder, chemical or carbonic acid etc. At least the agent in one of the containers is different from the agents in the other containers of the plurality of containers. In some embodiments, each one of the plurality of containers 430, 431, 432 comprises a fire extinguishing agent being different from the agents of all the other containers 430, 431, 432. As the modular fire extinguishing vehicle 400 comprises different kinds of agents, different agents may be used to extinguish a fire or imminent fire dependent of what is on fire. Thus, any agent particularly suitable to be used for suppressing a fire in a certain component of the vehicle may be selected and used. The fire extinguishing module 40 also comprises a fluid line 420 connected to the plurality of containers 430, 431, 432. The fluid line 420 comprises a connecting interface 405 for connection to a port of another vehicle 1. Thus, the connecting interface 405 is designed to be connected to the port of the other vehicle 1. In some embodiments, the modular fire extinguishing vehicle 400 also comprises a detector 440 configured to detect an indication of a selected port 11, 12, 13 on the other vehicle 1.

The modular fire extinguishing vehicle 400 also comprises a control device 200, 300 configured to obtain information about an ongoing or imminent fire in another vehicle 1 and information indicative of a position of the other vehicle 1. This information is for example sent from the other vehicle 1 directly to the modular fire extinguishing vehicle 400, or via the off-board system, using wireless communication and appropriate wireless interface. In response to such information, the control device 200, 300 is configured to autonomously operate the modular fire extinguishing vehicle 400 to drive to a position in proximity to the other vehicle 1. The operating is based on the position information of the other vehicle 1, to enable connection of the connecting interface 405 of the fluid line 420 to a port 11, 12, 13 of the other vehicle 1. The connection of the connecting interface 405 to a port is for example performed by a fire-fighter, or is automatically controlled by the control device 200, 300, as will be described in the following. The control device 200, 300 is also configured to control transfer of a selected one of the different types of fire extinguishing agents from its corresponding container 430, 431, 432 into the fluid line 420 wherein the selected type of fire extinguishing agent has been selected, based on the information about the ongoing or imminent fire in the other vehicle 1. Thereby a detected fire in the other vehicle 1 can be efficiently suppressed or extinguished.

Now turning to FIG. 4, where the modular fire extinguishing vehicle 400 shown in FIG. 3 will be described in more detail. The modular fire extinguishing vehicle 400 is here illustrated when connected to the other vehicle 1, that may be the assembled vehicle 1 illustrated in FIG. 1 comprising a fire extinguishing assistance system 10.

Figure 4:
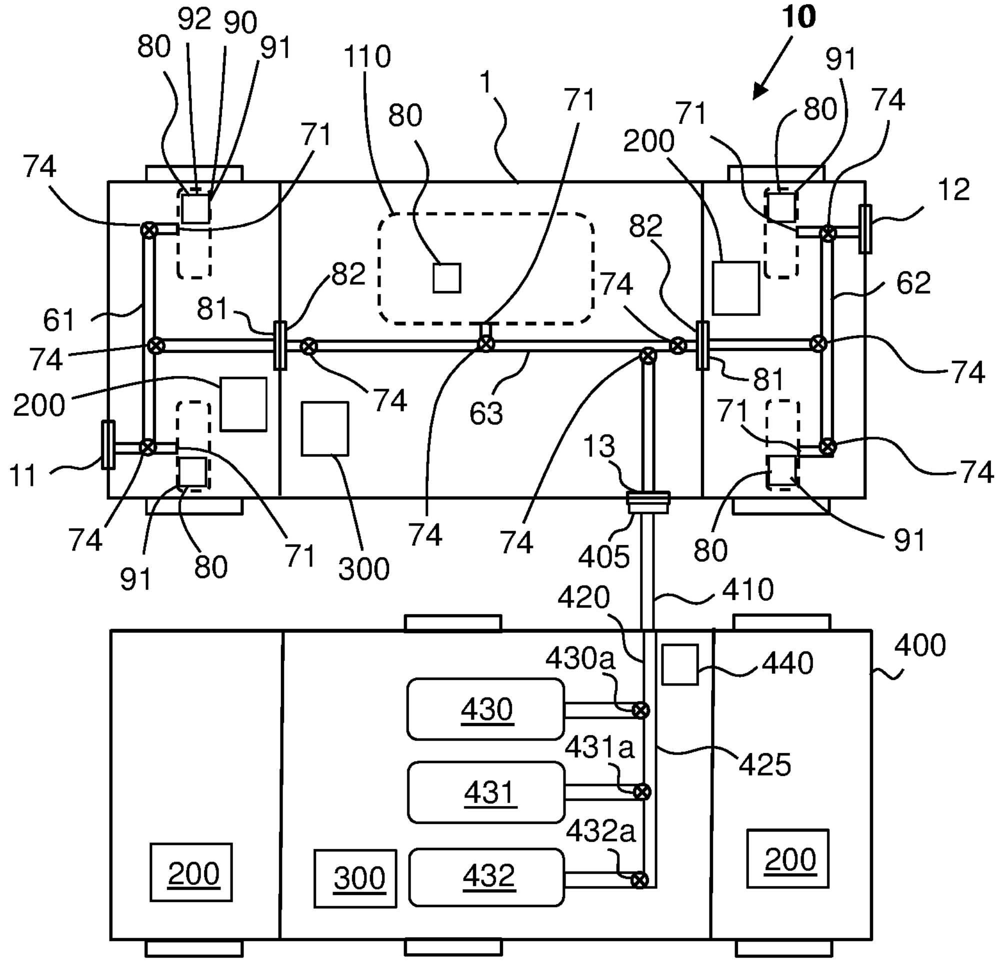
FIG. 4 illustrates a schematic horizontal cross-section of the modular fire extinguishing vehicle in FIG. 3, connected to another vehicle comprising a thereto mating fire assistance system.

In the embodiment of FIG. 4 the fluid line 420 comprises a manifold 425 and a fire hose 410 fluidly connected to the manifold 425. The fire hose 410 comprises a connecting interface 405 at its distal end, that is connected to the selected port 13 of the other vehicle 1. The manifold 425 is fluidly connected to the plurality of containers 430, 431, 432, for passing agent from the containers into the fire hose 410. The agents from the containers 430, 431, 432 are selectively allowed to pass via the manifold 425 to the fire hose 410 by means of a fluid control arrangement comprising valves 430*a*, 431*a*, 432*a* acting on the manifold 425. Thus, the valves are arranged to selectively open and close the flow in the manifold 425. The manifold 420 comprises pipes or fluid lines connected to the containers 430, 431, 432. The valves 430*a*, 431*a*, 432*a* are controlled by a control device 200, 300 of the fire extinguishing vehicle 400. The fluid control arrangement may also comprise pressure sensors, level sensors and/or flow sensors monitoring the pressure, level and flow rate, respectively, of the agents. These monitored properties may be sent to the control device 200, 300 such that the control device 200, 300 may control the valves 430*a*, 431*a*, 432*a* thereupon. In some embodiments, the control device 200, 300 determines what agent to use based on information received directly or indirectly from the other vehicle 1. The agents are typically pressurized in the containers, and an agent is pressed with high pressure from a container, when the manifold 425 is open for passage from the container. The vehicle 400, i.e. the fire extinguishing module 40, may comprise an air compressor arranged to pressurize the content of the containers. Alternatively, the fluid control arrangement comprises one or several pumps (not shown) arranged to pump agents from the containers.

In some embodiments, the information about an ongoing or imminent fire comprises information indicating the type of component 90, 91, 92, 110 being on fire or on imminent fire. The control device 200, 300 of the vehicle 400 is then configured to match the type of component 90, 91, 92, 110 with the different types of fire extinguishing agents, and to select a type of fire extinguishing agent to suppress the fire, based on the result of the matching. For example, the control device 200, 300 includes a pre-determined scheme of which agent to select, and thus which container to use, based on what type of component is on fire. In other words, a table or scheme maps each type of component to one or more suitable or compatible agents. The control device 200, 300 than controls the fluid control arrangement to allow agent from the selected container to be passed through the manifold 425 and stop the other agents from passing through the manifold 425. Optionally the selected agent is pumped through the manifold.

The modular fire extinguishing vehicle 400, e.g. the fire extinguishing module 40, may autonomously locate a selected port on the other vehicle 1. For example, the modular fire extinguishing vehicle 400 may know in beforehand where the ports on the other vehicle 1 are located and may then autonomously locate and connect to a port. The ports may be located on standard positions on the vehicle and its modules, that are the same for all modular vehicles of this type. The ports may also be located on a standard height. These standard positions and standard height may be known to the modular fire extinguishing vehicle 400. In some embodiments, the control device 200, 300 is configured to obtain information about a selected port on the other vehicle 1 that is selected for connecting the connecting interface 405 of the fluid line 410 for suppressing the ongoing or imminent fire. For example, the control device 200, 300 is configured to receive information about the selected port from the other vehicle 1. The other vehicle 1 may then communicate the information to the modular fire extinguishing vehicle 400 directly, with e.g. wireless communication. Alternatively, the control device 200, 300 is configured to receive information about the selected port from the off-board system. For example, the other vehicle 1 sends the information to the off-board system, and the off-board system sends the information to the modular fire extinguishing vehicle 400. In another example, the other vehicle 1 sends some kind of information to the off-board system, e.g. where in the vehicle 1 there is a fire or what type of component that is on fire. Thereafter, the off-board system independently identifies, based on information it has about the vehicle configuration of the other vehicle 1 and the received information, a selected port of the other vehicle 1, and sends information about the selected port to the modular fire extinguishing vehicle 400. Based on information about the selected port, the control device 200, 300 is configured to autonomously or remotely operate the modular fire extinguishing vehicle 400 to stop at a position, in which position the connecting interface 405 of the fluid line 410 is connectable to the selected port 11, 12, 13. For example, the information about the selected port includes information about the position or location of the selected port, in geometric coordinates or related to the other vehicle 1. By using e.g. a navigation system in the modular fire extinguishing vehicle 400, the vehicle 400 can drive to and stop at a position close to the selected port, such that the fluid line 420 can be connected to the selected port. In some embodiments, the modular fire extinguishing vehicle 400, i.e. the fire extinguishing module 40, comprising a detector 440 configured to detect an indication of a selected port 11, 12, 13 on the other vehicle 1. The indication is, for example, that the port is open or a highlighting of the port. The detector 440 is for example a light detector, a camera or a microphone. The detector 440 thus detects that the port is open, that the port is highlighted by means of illumination from lamps, or that the port is highlighted by means of sound. The control device 200, 300 is then configured to obtain the information of the detected indication of the selected port from the detector 440. The indication of the selected port may be used to identify the selected port more in detail when the modular fire extinguishing vehicle 400 has driven to the other vehicle 1.

When the modular fire extinguishing vehicle 400 has driven to the other vehicle 1 and found a selected port, the fluid line 420 should be connected to the selected port. In some embodiments, the fluid line 420 comprises a fire hose 410 configured to be extended from the modular fire extinguishing vehicle 400 to the selected port 11, 12, 13 of the other vehicle. The fire hose 410 may be made of a rigid material, e.g. stainless steel or plastic, or the fire hose 410 may be elastic and made of a soft or semi-rigid material such as rubber. Instead of a fire hose, the fluid line 420 may comprise a pipe or tube, made of a rigid material such as stainless steel or plastic. Thereby the fluid line 420 may be connected to the selected port. The fire hose 410 may be configured to be manually or automatically extended. The control device 200, 300 is configured to control extension of the fire hose 410 to the port 11, 12, 13, in case it is configured to be automatically extended. For example, the modular fire extinguishing vehicle 400, i.e. the fire extinguishing module 40, comprises an actuator, e.g. a motor, that controls extension of the fire hose 410, and thus the connecting interface 405. In one embodiment, the fire hose 410 is arranged to be extended to the selected port by means of a pulley system (not shown), on the fire extinguishing module 40, comprising a telescopic cylinder that has a very compact retracted length. The fire hose 410, i.e. the connecting interface 405, is for example attached to the front of the cylinder, and the cylinder is selectively extended and retracted by means of an actuator. Alternatively, the fire hose 410 is attached to a linear actuator (not shown), that is arranged to selectively extend and retract the fire hose 410. In any case, the control device 200, 300 is in some embodiments configured to control the position of the connecting interface 405 in a direction towards the other vehicle 1, i.e. towards the selected port, to be able to connect to the selected port.

The modular fire extinguishing vehicle 400 may also comprise a height actuator (not shown), that is arranged to change the vertical position of the connecting interface 405, to match the position of the selected port. The height actuator may be an independent actuator on the fire extinguishing module 40, that only controls the vertical position of the connecting interface 405, or it may be an already existing feature in the vehicle 400, for example embodied as the suspension system. In any case, the control device 200, 300 is in some embodiments configured to control the position of the connecting interface 405 vertically, to match the position of the selected port.

In order to safely transfer an agent into the selected port, the connecting interface 405 should be connected to the selected port. In some embodiments, the control device 200, 300 is configured to selectively control connection and disconnection of the connecting interface 405 of the fluid line 410 to a port 11, 12, 13 of the other vehicle 1. The connection mechanism is for example using electromagnetism. Alternatively, the connection mechanism comprises a quick connection or quick coupling. This kind of connection mechanism may be e.g. pressed together with force. It comprises a male part and a female part that are pushed and/or screwed together. For example, one of the connecting interface 405 and the port comprises a female part, and the other one comprises a male part. In order to lock the quick connection, a resilient locking may be used. The resilient locking may be actuated with an actuating means, e.g. electromagnetism, pressurized air etc., which is controlled from the control device 200, 300. In one example embodiment, the connection mechanism is a fire hose coupling with a female part and a male part. When the connecting interface 405 is connected to the port of the other vehicle, in some embodiments, the control device 200, 300 is configured to control a fluid control arrangement, comprising valves 430*a*, 431*a*, 432*a*, to transfer of the selected type of fire extinguishing agents from its corresponding container 430, 431, 432 in the fluid line 420. For example, a detector (not shown) may be arranged to detect that the connecting interface 405 is connected to the port, or a fire fighter may press a button on the vehicle 400, i.e. the fire extinguishing module 40, after connecting the connecting interface 405 to the port, to indicate that the connection is accomplished. This detection or indication is then obtained by the control device 200, 300.

The upper part of FIG. 4 also illustrates a schematic horizontal cross-section of an example embodiment of another vehicle, for example the assembled modular vehicle 1 illustrated in FIG. 1. The other vehicle 1 will now be explained in some more detail. In addition to what already explained in connection with FIG. 1, the functional module 40 comprises an energy storage 110, for providing extra energy to the drive modules 30. The other vehicle 1 also comprises a fire extinguishing assistance system 10, that can be used for conducting fire extinguishing agent from the modular fire extinguishing vehicle 400. The fire extinguishing assistance system 10 comprises a plurality of ports 11, 12, 13, an individual manifold 61, 62, 63 connected to each port 11, 12, 13 and at least one nozzle 71 connected to each individual manifold 61, 62, 63. A port may also be referred to as a “fire port”. The plurality of ports 11, 12, 13 are arranged at different locations in the vehicle 1, and all are accessible from the outside of the vehicle 1. In the example of FIG. 3, each module 30, 40 comprises one port. In more detail, a first port 11 is arranged in a first drive module 30*a*, a second port 12 is arranged in a second drive module 30*b*, and a third port 13 is arranged in the functional module 40. However, the vehicle 1 may comprise more or less ports than illustrated in the figures. The ports 11, 12, 13 are arranged in the sidewalls of the modules 30, 40.

Each port 11, 12, 13 is configured for receiving a fire extinguishing agent from a fire extinguishing vehicle 400 (FIG. 5). An individual manifold 61, 62, 63 is fluidly connected to each port 11, 12, 13 inside the vehicle 1. A manifold 61, 62, 63 comprises pipes or fluid lines that are arranged to transport the agent. Each individual manifold 61, 62, 63 is arranged to guide the fire extinguishing agent received via the port 11, 12, 13 and further to at least one nozzle 71 directed in the inside of the modular vehicle 1. Typically, each module 30, 40 comprises at least one port 11, 12, 13 and one manifold 61, 62, 63 connected to the at least one port. At least one nozzle 71 is connected to each manifold 61, 62, 63. A nozzle 71 is typically directed to a component of the vehicle 1 that is suspected to catch fire, such as an energy storage 92, 110, one or several components of the propulsion system 91 such as motor, e.g. an electrical motor, or a braking system 90. Alternatively, a nozzle 71 may be connected to a fluid system already present in the vehicle 1, such as a cooling system (not shown) of an energy storage or motor. An overpressure may then be built up in the cooling system, whereby the over pressure is released from the cooling system by the cooling system itself, e.g. via an over pressure valve (not shown). An overflow of agent may also be passed out from the vehicle 1 via the overpressure valve, such that new agent continuously can be passed via the nozzle to a location of the fire or imminent fire.

As previously explained, each module 30, 40 comprises a control device 200, 300. One or several of the control devices 200, 300 are configured to detect an ongoing or imminent fire in the vehicle 1. In the following it will be referred to only one control device 200, 300, but is should be understood that several control devices 200, 300 may act at the same time. The system 10 comprises a plurality of detectors 80 configured to detect fire related properties in the modular vehicle 1. The detectors 80 are for example located in the vicinity of the energy storages 92, 110, the propulsion system 91, the braking system 90 etc. A detector 80 is for example a temperature detector, a smoke detector, a camera and/or a gas detector. The detectors 80 are configured to detect or collect fire related properties such temperature, presence of smoke, smoke particles, gas, pictures of fire etc., and to send information about the properties to one or several of the control devices 200, 300. The one or several control devices 200, 300 are configured to receive the information from the detectors 80, and to detect an ongoing or imminent fire upon at least one detected fire related property meets one or several fire criteria. For example, if the temperature goes beyond a predetermined temperature threshold, e.g. an overheating threshold, it is determined that a fire is ongoing or imminent.

The control device 200, 300 is configured to select one or more ports 11, 12, 13 that are most suitable for passing an agent, in order to suppress the detected fire or imminent fire most efficiently. The selection is typically based on the location of the detected fire or imminent fire, and thus based on the location of the detector that detected the fire or imminent fire. For example, the control device 200, 300 includes a pre-determined scheme of which port to select, based on where the fire or imminent fire is located. In other words, a table or scheme mapping each location in the module to one or more suitable or compatible ports. For example, the pre-determined scheme may indicate which port 11, 12, 13 to select in order to have the shortest distance through the manifolds to the location. In one embodiment, the control device 200, 300 is configured to determine a location in the vehicle related to the ongoing or imminent fire, and to select a port of the plurality of ports 11, 12, 13 for receiving a fire extinguishing agent to the ongoing fire, as being a port 11, 12, 13 that is connected to at least one manifold 61, 62, 63 that includes the shortest distance to the determined location. In another embodiment, the control device 200, 300 is configured to select a port 11, 12, 13 that is located in the same module 30, 40 as where the fire or imminent fire is detected. In some situations, a port may be broken, damaged or not accessible. The control device 200, 300 may obtain such information via function checks, e.g. check if the ports are openable, or via other sensors in the vehicle, providing information if the vehicle is standing close to a wall or similar making a port inaccessible.

In order to direct agent in the manifolds to the location of the fire or imminent fire, the system 10 comprises a plurality of valve devices 74. The valve devices 74 are configured to selectively allow, or disallow, passage of a fire extinguishing agent in one or several of the manifolds 61, 62, 63. The control device 200, 300 is configured to control the plurality of valve devices 74 such that fire extinguishing agent can be passed from the port 11, 12, 13 selected for receiving a fire extinguishing agent, to the location related to the ongoing or imminent fire. Thus, the valve devices 74 comprises valves that can be actuated to close or open fluid passage in the manifolds. The valve devices 74 are connected to the control device 200, 300 such that the control device 200, 300 can control the valves to open or close fluid passage.

In some embodiments, a manifold of a module 30, 40 is connectable to a manifold of another module 30, 40. In order to connect the manifolds, the system 10 comprises a plurality of module connection ports 81, 82 arranged in the modules 20, 30. Thus, the ports 81, 82 are arranged for connecting manifolds 61, 62, 63 of the individual modules 30, 40. The module connection port 81, 82 is typically arranged on a side of the module 30, 40 facing another module 30, 40 when the modules are interconnected. The module connection ports 81, 82 may comprise a locking mechanism in order to lock the ports to each other to enable fluid transfer between the ports 81, 82 without leakage.

Upon an ongoing or imminent fire being detected, the one or several control devices 200, 300 is configured to configure at least one of the plurality of ports 11, 12, 13 selected for receiving a fire extinguishing agent to the ongoing or imminent fire, to assist in suppressing the fire. The selected at least one port 11, 12, 13 may be configured in a plurality of ways.

Figure 5A:
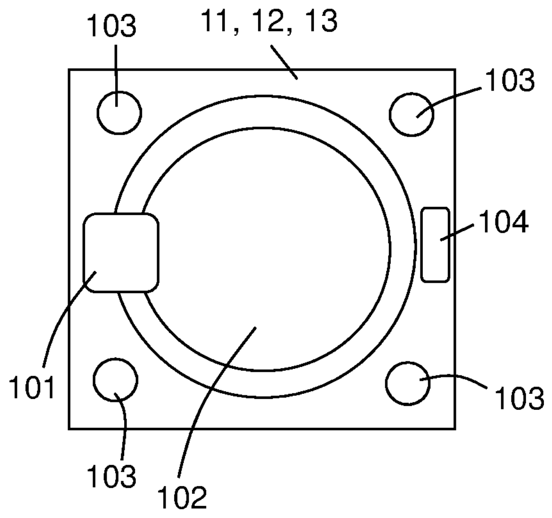
FIGS. 5A-5B illustrates a port of the other vehicle in a closed state and an open state according to some embodiments.
Figure 5B:
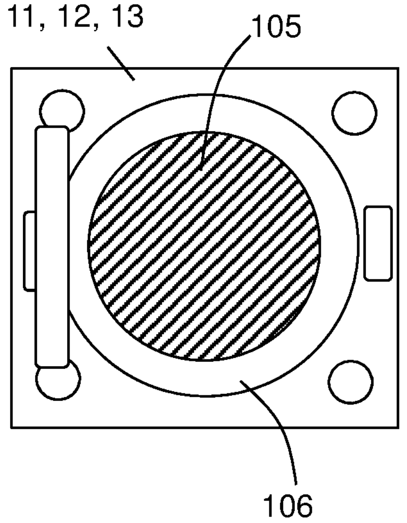

FIG. 5A illustrates an example port 11, 12, 13 in a closed state, and FIG. 5B illustrates the same port 11, 12, 13 in an open state. In the closed state, the lid 102 is closed. In the open state, the lid 102 is open and the port opening 105 is accessible. The port 11, 12, 13 comprises a port mechanism 101 arranged to selectively open and close the port 11, 12, 13. The port 11, 12, 13 for example comprises a lid 102 or a valve (not shown) configured to close the port tightly, that the port mechanism 101 is configured to actuate. In some embodiments, each port 11, 12, 13 comprises an individual port mechanism 101. The control device 200, 300 is then configured to configure the port 11, 12, 13 selected for receiving a fire extinguishing agent to the ongoing or imminent fire by controlling the port mechanism 101 to open the port 11, 12, 13. Thereby, it is possible to pass the agent into the selected port. As the port will be opened, it will also be visibly indicated which port is suitable for receiving the agent. In some embodiments, all ports 11, 12, 13 of the vehicle 1 are opened when a fire or imminent fire is detected. Then, any port may be used for receiving the agent.

To further support fast identification of the selected port 11, 12, 13, the port 11, 12, 13 comprises, in some embodiments, at least one indication device 103, 104 configured to indicate the port 11, 12, 13 visually and/or audially. The indication device 103, 104 is for example a lamp 103, e.g. a light emitting diode (LED), or a loud speaker 104. In other words, selected ports are visually or audibly highlighted. The control device 200, 300 is then configured to configure the port 11, 12, 13 selected for receiving a fire extinguishing agent to the ongoing or imminent fire by indicating with the at least one indication device 103, 104 of the selected port 11, 12, 13. Thus, the control device 200, 300 will light one or several lamps or make a sound via the loudspeaker of the selected port 11, 12, 13. The light may be flashing. In case several ports are selected, then all the selected ports will be indicated.

The agent will be pushed via the fire hose 410 with some force. To avoid that the fire hose 410 falls off the selected port 11, 12, 13, the port may comprise a locking interface 106 for connecting and locking a fire hose interface 405 to the port 11, 12, 13. Thus, in some embodiments, each port 11, 12, 13 comprises a locking interface 106 for connecting and locking a connecting interface 405 to the port 11, 12, 13. The locking mechanism of the locking interfaces for example uses electromagnetism, to temporarily lock the fire hose to the port. Thus, one of the locking interface 106 and the connecting interface 405 is electromagnetic, and the other one of the locking interface 106 and the connecting interface 405 is at least partly made of ferromagnetic material. In an embodiment where the connecting interface 405 is electromagnetic, the control device 200, 300 powers the connecting interface 405 via an electric circuit (not shown) whereby the connecting interface 405 attracts the locking interface 106 made of ferromagnetic material. Thus, by holding the connecting interface 405 and the locking interface 106 together and powering the connecting interface 405, the interfaces 106, 405 becomes securely connected and locked to each other. When the control device 200, 300 stops powering the connecting interface 405, the connecting interface 405 no longer attracts the locking interface 106 and can be removed. The connecting interface 405 is thereby unlocked. In the figures, the locking interface 106 is arranged around the port opening 105. Alternatively, the interfaces 106, 405 may use some kind of key and key hole principle.

Figure 6:
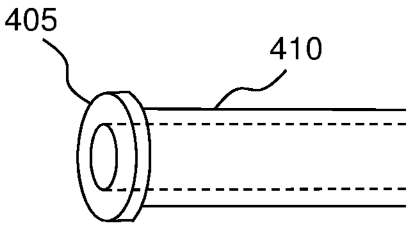
FIG. 6 illustrates a part of a fluid line and a connecting interface of the fluid line according to some embodiments.

FIG. 6 illustrates a part of the fluid line 420, more precisely the fire hose 410, and the connecting interface 405 of the fluid line according to some embodiments, in isolation. In some embodiments, the connecting interface 406 may have a flat circular shape, which matches a flat circular shape of the locking interface 106 on the port. However, other shapes are also conceivable.

Figure 7:
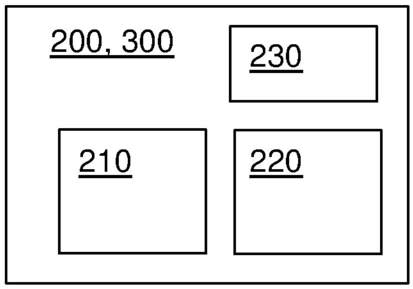
FIG. 7 illustrates an example implementation of a control device according to some embodiments.

Now turning to FIG. 7 which illustrates an example implementation a control device configured to implement the proposed method according to the second aspect. In this example the control device is embodied as a control device 200, 300 for use in a modular fire extinguishing vehicle 400, such as the vehicle 400 previously described. In some embodiments, the control device 200, 300 is a “unit” in a functional sense. Hence, in some embodiments the control device 200, 300 is a control arrangement comprising several physical control devices that operate in corporation. The control device 200, 300 comprises hardware and software. The hardware basically comprises various electronic components on a Printed Circuit Board, PCB. The most important of those components is typically a processor 210 along with a memory 220. It should be understood that the control device 100 in the off-board system for example includes more or less the same components as the control device 200, 300 illustrated in FIG. 7.

The control device 200, 300 also comprises one or more communication interfaces 230, enabling the control device 200, 300 to communicate with other modules 30, 40 of the modular fire extinguishing vehicle 400, or of other vehicles. The communication between the modules is as mentioned above wireless, conductive or wired. Wired communication may be implemented standard protocols such as Controller Area Network, CAN. CAN is a robust vehicle bus standard designed to allow microcontrollers and devices to communicate with each other in applications without a host computer. Wireless communication between the modules may be implemented using any short-range communication protocol such as Bluetooth or 802.11.

The one or more communication interfaces 230 is also configured to enable wireless communication with the control device 100, i.e. with the off-board system. The wireless communication between the control device 200, 300 in the vehicle and the control device 100 in the off-board system is e.g. implemented using 4G, 5G, V2V (Vehicle to Vehicle) or any other suitable wireless communication protocol.

The control device 200, 300, or more specifically the processor 210 of the control device 200, 300, is configured to cause the control device 200, 300 to perform all aspects of the method described above and below, and in particular the method according to the second aspect. Thus, the control device 200, 300 is configured for performing a method for assisting a fire extinguishing vehicle 400 in extinguishing an ongoing or imminent fire in the modular vehicle 1. This is typically done by running computer program code stored in the memory 220 in the processor 210 of the control device 200, 300. Thus, the computer program comprises instructions which, when the program is executed by a control device, cause the control device to carry out the method according to any one of the embodiments as described herein. The program may be stored on a computer-readable storage medium comprising instructions which, when executed by a control device, cause the control device to carry out the method according to any one of the embodiments as described herein.

Figure 8:
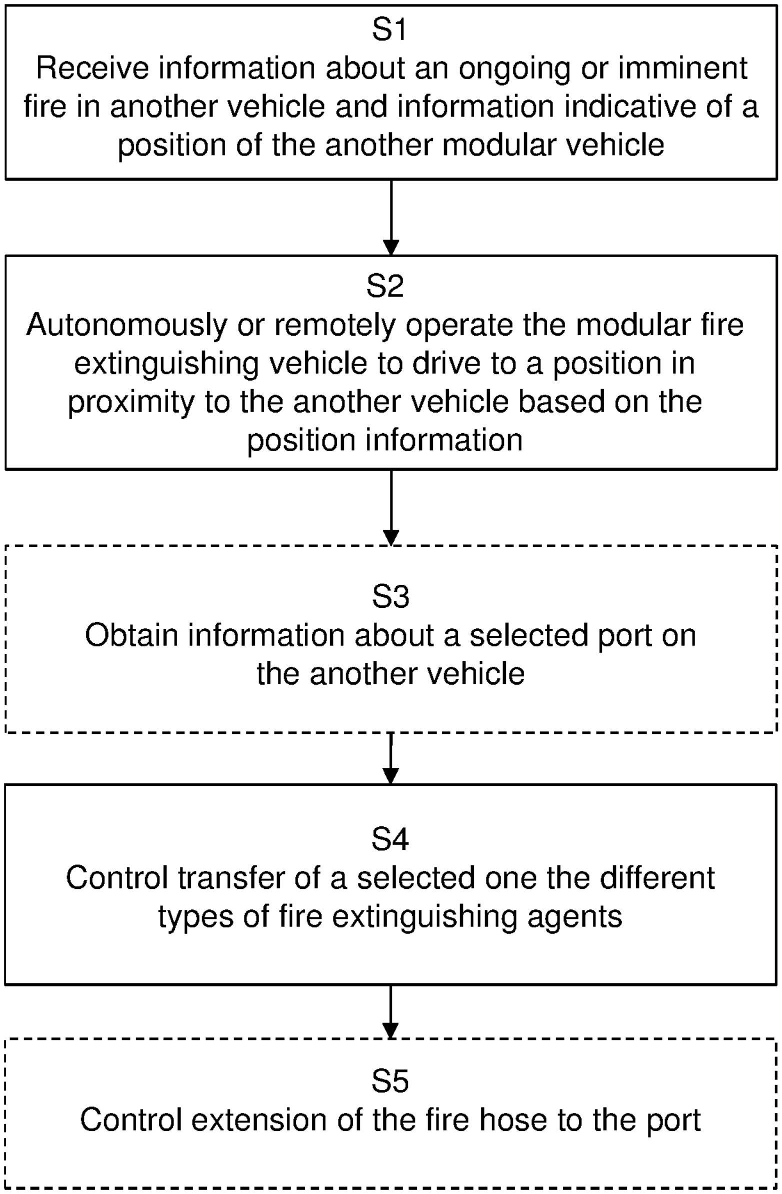
FIG. 8 illustrates a flow chart of a method according to the second aspect, according to some embodiments.

The proposed technique will now be explained with reference to the flow chart of FIG. 8, illustrating a corresponding method performed by a control device 200, 300 of the modular fire extinguishing vehicle 400. As previously described, this disclosure proposes, according to the second aspect, a method for operating a modular fire extinguishing vehicle, for example the modular vehicle 400 in the figures. The method may be implemented as a computer program comprising instructions which, when the program is executed by a computer (e.g. a processor in a control device 200 in drive module 30 or a control device 300 in the fire extinguishing module 40), cause the computer to carry out the method. The proposed method is e.g. performed in a control device 200 of a drive module 30 assigned to be a master drive module. However, it must be appreciated that the method may alternatively, at least partly, be implemented in several of the control devices 200, 300 of the modules of the vehicle, or the implementation may be distributed among several or all of the control devices 200, 300. The method may be performed at any time, e.g. during driving or stand still of the modular fire extinguishing vehicle 400.

The method comprises obtaining S1 information about an ongoing or imminent fire in another vehicle 1 and information indicative of a position of the other vehicle 1. In other words, the modular fire extinguishing vehicle 400 is informed about a fire that is taking place in another vehicle. The information is for example sent directly from the other vehicle to the modular fire extinguishing vehicle 400, or the information is sent via the off-board system. In other words, in some embodiments, the obtaining S1 information about a selected port comprises receiving information about the selected port from the other vehicle 1 and/or from the off-board system.

The modular fire extinguishing vehicle 400 will then autonomously take actions to mitigate the fire. Thus, the method further comprises autonomously operating S2 the modular fire extinguishing vehicle 400 to drive to a position in proximity to the other vehicle 1 based on the position information of the other vehicle 1, to enable connection of the connecting interface 405 of the fluid line 420 to a port 11, 12, 13 of the other vehicle 1. In other words, the modular fire extinguishing vehicle 400 moves, such that it is within a short distance (e.g. a few meters) from the other vehicle 1, where it is possible to assist in mitigating the fire. Thus, the operating S2 includes autonomously navigating the modular fire extinguishing vehicle 400 to the position.

The modular fire extinguishing vehicle 400 may also try to determine which port in the other vehicle is the best suited to use for mitigating the fire. In other words, in some embodiments, the obtaining S1 comprises obtaining information about a selected port on the other vehicle 1 that is suitable for connecting the connecting interface 405 of the fire hose 410 to, for suppressing the ongoing or imminent fire. As explained, the obtaining S1 for example comprises obtaining the information directly from the other vehicle, or via an off-board system. Alternatively, the obtaining S1 information about a selected port comprises obtaining information of a detected indication of a selected port 11, 12, 13 on the other vehicle 1. The indication is, for example, illumination from lamps or sound from loudspeakers on or in the vicinity of the selected port. The method may include detecting such illumination or sound by means of a light detector and microphone.

Upon obtaining such information, the operating S2 comprises autonomously operating the modular fire extinguishing vehicle 400 to stop at a position, in which position the connecting interface 405 of the fluid line 420 is connectable to the selected port 11, 12, 13, based on the information about the selected port. Thus, based on the detecting, the method includes determining where to drive such that the connecting interface 405 can be connected to the selected port. The method may then include to, for example, determining a position of the selected port in relation to a position of the modular fire extinguishing vehicle 400, for example a position of the connecting interface 405, and to change the position of the vehicle 400 and/or the connecting interface 405 such that the position of the connecting interface 405 matches the position of the selected port, and they thereby can be connected.

In some embodiments, the method comprises selectively controlling S3 connection and disconnection of the connecting interface 405 of the fluid line 420 to a port 11, 12, 13 of the other vehicle 1. For example, the controlling S3 comprises controlling extension of a fire hose 410 and the thereto connected connecting interface 405 to the selected port. In some embodiments, the controlling S3 comprises controlling locking the connecting interface 405 to the selected port.

When the connecting interface 405 is connected to the selected port, one can start pass agent into the port. However, there are several different types of agents to choose from and an agent may be selected that is predicted to most efficiently suppress the fire or imminent fire. In some embodiment, the method comprises controlling transfer S4 of a selected one the different types of fire extinguishing agents from its corresponding container 430, 431, 432 into the fluid line 420. The selected type of fire extinguishing agent is selected based on the information about the ongoing or imminent fire in the modular vehicle 1. For example, the information includes information of the type of component that is on fire. The selecting for example includes using a predetermined scheme or table matching agents with types of components. The agent that the scheme points out to be appropriate for suppressing the fire or imminent fire in the component, is selected. In other words, in some embodiments, the information about an ongoing or imminent fire comprises information indicating the type of component 90, 91, 92, 110 being on fire or on imminent fire. Then, the controlling transfer S4 comprises matching the type of component 90, 91, 92, 110 with the different types of fire extinguishing agents, and selecting a type of fire extinguishing agent based on the result of the matching.

In some embodiments, the controlling transfer S4 comprising controlling transfer of the selected fire extinguishing material into the port 11, 12, 13, when the connecting interface 405 is connected to the port 11, 12, 13. The controlling transfer S4 includes for example receiving connection data from a sensor detecting an accomplished connection or locking.

In some embodiments, the fluid line 420 comprises a fire hose 410 configured to be extended from the modular fire extinguishing vehicle 400 to the port 11, 12, 13 of the other vehicle 1, wherein the method comprises controlling S5 extension of the fire hose 410 to the port 11, 12, 13. The fire hose 410 is for example rolled or otherwise compressed to take less space, and is extended e.g. unrolled to the selected port using an actuator or similar as has previously been described.

The terminology used in the description of the embodiments as illustrated in the accompanying drawings is not intended to be limiting of the described method; control arrangement or computer program. Various changes, substitutions and/or alterations may be made, without departing from invention embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A modular fire extinguishing wheeled vehicle for extinguishing a fire occurring in a subject vehicle, said modular fire extinguishing vehicle comprising:

at least one drive module;

a fire extinguishing module releasably connected to the at least one drive module, wherein the fire extinguishing module comprises a plurality of containers each comprising a different fire distinguishing agent from a group of fire extinguishing agent; a fluid line operatively connectable to each of the plurality of containers, wherein the fluid line comprises a connecting interface for connecting to a port of the subject vehicle; and a control device configured to:

obtain information about the fire occurring in the subject vehicle and information indicative of a location of the subject vehicle;

autonomously operate the modular fire extinguishing vehicle to drive to the location of the subject vehicle based on the location information of the subject vehicle and to connect the connecting interface of the fluid line to the port of the subject vehicle;

determine a selected fire extinguishing agent from the group of fire extinguishing agents based on the information about the fire in the subject vehicle; and control transfer of the selected fire extinguishing agent into the fluid line for delivery to the port of the subject vehicle.

2. The modular fire extinguishing wheeled vehicle according to claim 1, wherein the control device is configured to selectively control connection and disconnection of the connecting interface of the fluid line to the port of the subject vehicle.

3. The modular fire extinguishing wheeled vehicle according to claim 1, wherein the control device is configured to control a fluid control arrangement to transfer the selected fire extinguishing agent from one of the plurality of containers to the fluid line, when the connecting interface is connected to the port of the subject vehicle.

4. The modular fire extinguishing wheeled vehicle according to claim 1, wherein the subject vehicle comprises components that react differently to different fire extinguishing agents, wherein the information about the fire occurring in the subject vehicle comprises information indicating a component of the subject vehicle that is on fire, and wherein the control device is configured to determine the selected fire extinguishing agent based on the component of the subject vehicle that is on fire.

5. The modular fire extinguishing wheeled vehicle according to claim 1, wherein the control device is configured to obtain information about the port on the subject vehicle, and based on the information operate the modular fire extinguishing vehicle to stop at a location to facilitate connection of the connecting interface of the fluid line to the port of the subject vehicle.

6. The modular fire extinguishing wheeled vehicle according to claim 5, comprising a detector configured to detect an indication of the port the subject vehicle, and wherein the control device is configured to obtain the information of the detected indication from the detector.

7. The modular fire extinguishing vehicle according to claim 5, wherein the control device is configured to receive information about the port of the subject vehicle from the subject vehicle and/or from an off-board system.

8. The modular fire extinguishing wheeled vehicle according to claim 1, wherein the fluid line comprises a fire hose configured to be extended from the modular fire extinguishing vehicle to the port of the subject vehicle, and wherein the control device is configured to control an extension of the fire hose.

9. A method for operating a modular fire extinguishing wheeled vehicle for extinguishing a fire occurring in a subject vehicle, said modular fire extinguishing vehicle comprising at least one drive module, and a fire extinguishing module releasably connected to the at least one drive module; wherein the fire extinguishing module comprises a plurality of containers each comprising a different fire distinguishing agent from a group of fire extinguishing agents, a fluid line operatively connectable to each of the plurality of containers, wherein the fluid line comprises a connecting interface for connecting to a port of the subject vehicle, and wherein the method comprises:

obtaining information about the fire occurring in the subject vehicle and information indicative of a location of the subject vehicle;

autonomously operating the modular fire extinguishing vehicle to drive to the location of the subject vehicle based on the location information of the subject vehicle and to connect the connecting interface of the fluid line to the port of the subject vehicle;

determine a selected fire extinguishing agent from the group of fire extinguishing agents based on the information about the fire in the subject vehicle; and control transfer of the selected fire extinguishing agent into the fluid line for delivery to the port of the subject vehicle.

10. The method according to claim 9, comprising selectively controlling connection and disconnection of the connecting interface of the fluid line to the port of the subject vehicle.

11. The method according to claim 9, wherein the controlling transfer comprising controlling transfer of the selected fire extinguishing material into the port of the subject vehicle, when the connecting interface is connected to the port.

12. The method according to claim 9, wherein the subject vehicle comprises components that react differently to different fire extinguishing agents, wherein the information about the fire occurring in the subject vehicle comprises information indicating a component of the subject vehicle that is on fire, and wherein the controlling transfer comprises:

determining a selected fire extinguishing agent based on the component of the subject vehicle that is on fire.

13. The method according to claim 9, further comprises:

obtaining information about the port of the subject vehicle; and based on the information operate the modular fire extinguishing vehicle to stop at a location to facilitate connection of the connecting interface of the fluid line to the port of the subject vehicle.

14. The method according to claim 13, wherein the obtaining information about a selected port comprises:

obtaining information of a detected indication of the port of the subject vehicle.

15. The method according to claim 13, wherein the obtaining information about a selected port comprises receiving information about the port of the subject vehicle from the subject vehicle and/or from an off-board system.

16. The method according to claim 9, wherein the fluid line comprises a fire hose configured to be extended from the modular fire extinguishing vehicle to the port of the subject vehicle, and wherein the method comprises:

controlling an extension of the fire hose.

17. A computer program product comprising a computer program code stored on a non-transitory computer-readable medium, said computer program product used for operating a modular fire extinguishing wheeled vehicle for extinguishing a fire occurring in a subject vehicle, said modular fire extinguishing wheeled vehicle comprising at least one drive module, and a fire extinguishing module releasably connected to the at least one drive module; wherein the fire extinguishing module comprises a plurality of containers each comprising a different fire distinguishing agent from a group of fire extinguishing agents, a fluid line operatively connectable to each of the plurality of containers, wherein the fluid line comprises a connecting interface for connecting to a port of the subject vehicle, said computer program code comprising computer instructions to cause one or more control devices to perform the following operations:

obtaining information about the fire occurring in the subject vehicle and information indicative of a location of the subject vehicle;

autonomously operating the modular fire extinguishing vehicle to drive to the location of the subject vehicle based on the location information of the subject vehicle and to connect the connecting interface of the fluid line to the port of the subject vehicle;

determine a selected fire extinguishing agent from the group of fire extinguishing agents based on the information about the fire in the subject vehicle; and control transfer of the selected fire extinguishing agent into the fluid line for delivery to the port of the subject vehicle.

* * * * *